US006608989B2

(12) United States Patent
Anderson et al.

(10) Patent No.: US 6,608,989 B2
(45) Date of Patent: Aug. 19, 2003

(54) MEDIA POSITION RETAINING DEVICE (75) Inventors: Bradley J. Anderson, Boise, ID (US);
William I. Herrmann, Eagle, ID (US);
Bruce L. Johnson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/960,134

(22) Filed: Sep. 21, 2001

(65) Prior Publication Data
US 2003/0059238 A1 Mar. 27, 2003

(51) Int. Cl.⁷ .............................................. G03G 15/00
(52) U.S. Cl. .................... 399/377; 399/379; 399/380
(58) Field of Search ................................. 399/377, 379, 399/380; 355/75

(56) References Cited

U.S. PATENT DOCUMENTS

| | | | | |
|---|---|---|---|---|
| 4,357,101 A | * | 11/1982 | Sasaki et al. ................. 355/75 |
| 4,394,084 A | * | 7/1983 | Kuehnle ..................... 399/107 |
| 4,474,457 A | * | 10/1984 | Phelps ........................ 399/379 |
| 4,891,667 A | | 1/1990 | Bruce, Jr. et al. ........... 399/379 |
| 5,136,331 A | * | 8/1992 | Gracie ......................... 399/377 |
| 5,191,442 A | * | 3/1993 | Bar-Lev et al. ......... 399/379 X |
| 5,483,325 A | * | 1/1996 | Bodapati et al. ............ 399/377 |
| 5,574,542 A | * | 11/1996 | Brook, III ................... 399/380 |

FOREIGN PATENT DOCUMENTS

JP          6-27545          * 2/1994

* cited by examiner

*Primary Examiner*—Hoan Tran (57) ABSTRACT

A device and method for retaining media in a predetermined position for imaging. A platen for a flatbed imaging device includes an electrostatic charge that is imparted to the platen either passively or actively. The electrostatic charge is imparted by a movement of a charged object relative to the platen. In one embodiment of the invention, the electrostatic charge is imparted to the platen passively in the sense that the electrostatic charge is imparted by the placement of a platen cover having one triboelectric value in proximity to a platen having another triboelectric value. In an active embodiment of the invention, the electrostatic charge is imparted to the platen actively in the sense that the requisite electrostatic charge is imparted by movement of a charge emitting device, such as a corona wire, in close proximity to the platen.

20 Claims, 7 Drawing Sheets

MEDIA POSITION RETAINING DEVICE

FIELD OF THE INVENTION

The present invention relates generally to imaging devices and more particularly to a device that aides placement and ensures accurate retention of documents on a platen of a flatbed imaging device.

BACKGROUND OF THE INVENTION

Flatbed imaging devices including electrostatic and electronic document scanners and copiers, as well as multi function peripherals, typically require a face-down placement of media upon a transparent platen. An imaging assembly is typically positioned below the platen and is configured to obtain digital image data representative of an image represented on a sheet media. A transport assembly transports the imaging assembly in a plane substantially parallel to the plane of the platen. Image data includes data relating to the position and alignment of the media on the platen.

Flatbed imaging devices typically include a hinged platen cover that serves several purposes. The platen cover may serve both as a weight to hold the media as flat as possible and as an appropriately colored background for media that does not require the entire functional area of the platen. Additionally, the platen cover may include a document feeding mechanism for automatically feeding media onto the platen for automated multiple-document scanning.

A platen including a larger functional surface allows for scanning a wider range of original media, but an oversized platen may also present alignment problems when a user places curled, distorted, odd-shaped, small, multiple, or lightweight media on the platen. Curled, distorted, odd-shaped, small, multiple, or lightweight originals shift out of position easily.

Figures 1, 2:
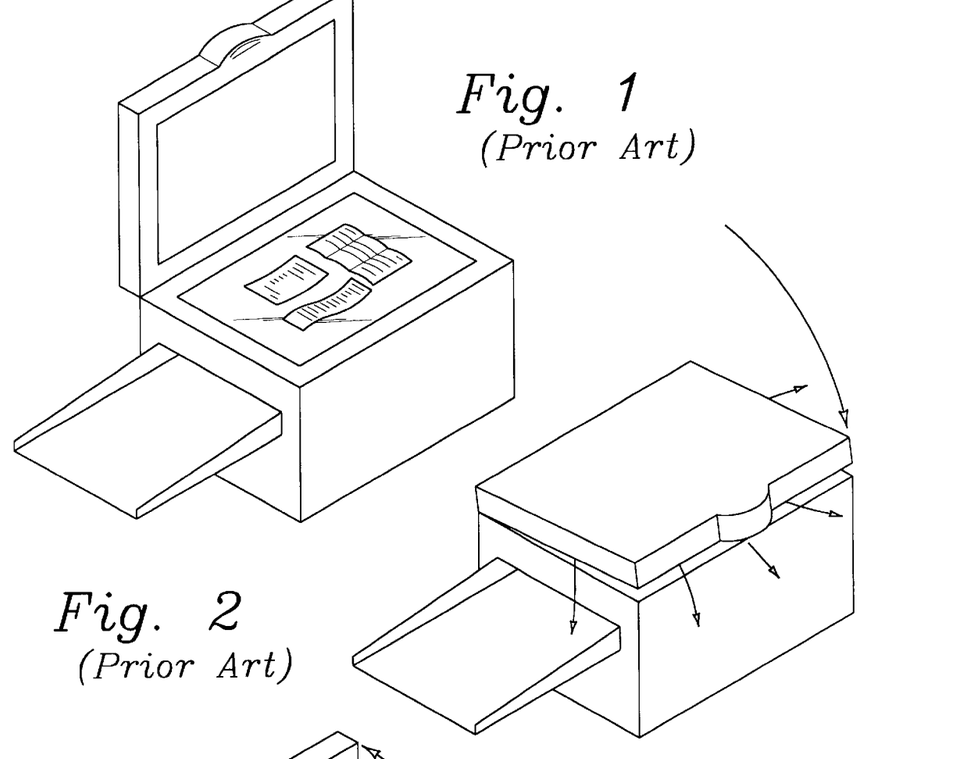
FIG. 1 is a representative perspective view of a flatbed imaging device according to the prior art.
FIG. 2 is a representative perspective view of a flatbed imaging device according to the prior art.
Figure 3:
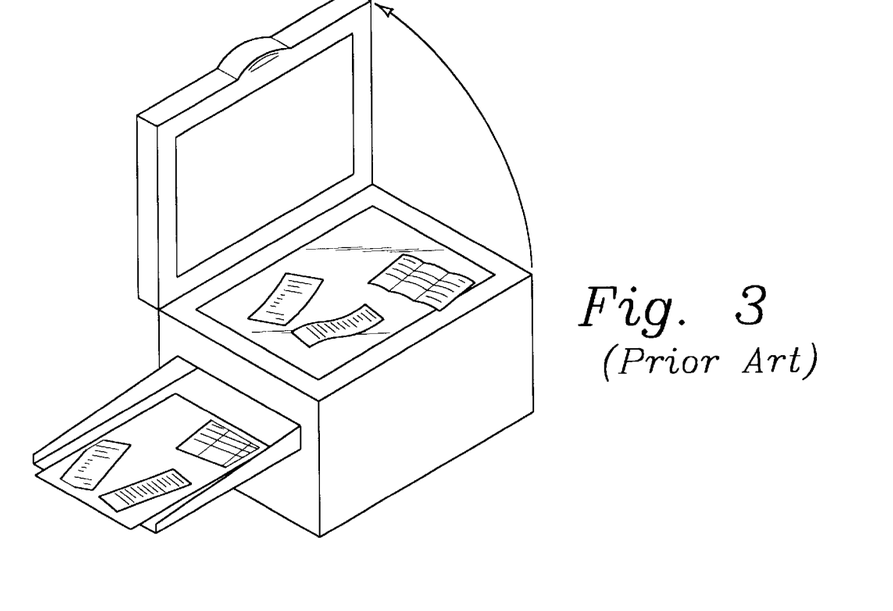
FIG. 3 is a representative perspective view of a flatbed imaging device according to the prior art.

Closing and opening the platen cover of a scanning machine may exacerbate the problem. Air turbulence caused by the two large flat planes of the platen and the platen cover can easily shift the position of the original media, whether during the closing of the platen cover for scanning or during opening for adjustment of the originals. This problem is particularly evident when scanning curled items like thermal facsimile papers, lightweight media such as receipts, or multiple smaller originals such as photographs or checks. FIGS. 1 through 3 illustrate the problems presented by flatbed imaging devices of the prior art.

Consequently, accurately scanning any media other than the most common sizes of originals requires tedious care and sometimes multiple readjustments to obtain a single useable image. This problem can result in inaccurate imaging, waste of operator time, waste of resources, and undue wear and tear on the imaging device.

Therefore, it may be advantageous to provide a simple and low-cost device that will easily hold any assortment or single piece of media, whether curled, distorted, odd-shaped, small, multiple, or lightweight, securely against the scanning or copying platen throughout the manual placement, scanning, and readjustment of the original media, and the opening and closing of the platen cover. It may also be advantageous to provide a method for retaining media against the platen in substantially the original placement in such a manner that the media does not shift prior to image processing. Additionally, there may be advantage in preserving an existing alignment of the media when the platen cover is opened for adjustment to the position of the media. The present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

SUMMARY OF THE INVENTION

The present invention is directed to a device for retaining media in a predetermined position for imaging. The present invention is further directed to a platen for a flatbed imaging device which includes an electrostatic charge that is imparted to the platen either passively or actively. The electrostatic charge occurs due to a movement of a charged object relative to the platen. In one embodiment of the invention, the electrostatic charge is imparted to the platen passively in the sense that the required charge is imparted by the placement of two materials exhibiting different triboelectric values in proximity to one another. In an active embodiment of the invention, the electrostatic charge is imparted to the platen actively in the sense that the requisite charge is imparted to the platen by the movement of a charge emitting device, such as a corona wire, in close proximity to the platen. The charge emitting device emits charged particles which are absorbed by the platen resulting in a charged platen surface.

In one embodiment of the invention, a flatbed imaging device includes a platen formed of a first insulator material having a first triboelectric effect value and a platen cover for the flatbed imaging device including an opposing insulator material having a second triboelectric effect value. An electrostatic charge is created on the surface of the platen by the relative movement of the opposing insulator material to the first insulator material of the platen. The action of opening and closing the platen cover provides the requisite relative movement to create and maintain a slight static electric charge on the surface of the platen. According to the invention, an associated electric field is created and maintained across the surface of the platen and material having a charge opposite the field will be attracted to the surface of the platen. The opposing insulator material may be incorporated with or integral to the platen cover.

This embodiment of the invention relies upon an electrostatic charge that occurs when two materials having disparate triboelectric characteristics are placed in position relative to one another permitting a transfer of electrons in what is characterized as a triboelectric transfer. When the materials are separated, a residual electrostatic charge remains on the surface of a material having lost electrons in the transfer.

The following is a list of materials arranged in series to show their relative position in a triboelectric series with the first materials being at the positive end of the series and the last materials being at the negative end of the series: air, glass, nylon, wool, silk, aluminum, paper, cotton (triboelectric value equal to zero), steel, hard rubber, nickel, copper, brass, silver, gold, platinum, acetate, rayon, polyester, styrene, orion, saran, polyurethane, polyethylene, polypropylene vinyl (PVC), teflon and silicone rubber. It should be recognized that the above list is provided for illustrative purposes only and that it is not intended that the listing be limiting in any sense as all materials exhibit a triboelectric value.

In general, materials at the upper end of the series tend to give up electrons freely during a triboelectric electron transfer resulting in a positively charged material. Conversely, materials at the lower end of the series tend to gain electrons freely during a triboelectric electron transfer resulting in a negatively charged material. It will be observed that cotton is positioned at a zero point in the series. Paper, the most common media is positioned prior to cotton in the series and exhibits a slight positive charge and a slight tendency to give up electrons. When paper is placed on glass that has been in contact with a material having a negative triboelectric value, the glass, having a greater positive charge than the paper, will attract the paper.

By way of illustration, when a platen cover including a hard rubber backing is placed in contact with a glass platen, and then removed, a residual positive static charge is created on the surface of the glass. Ideally, the media should be farther away in the triboelectric series to the material forming the platen than it is to the second insulator material of the platen cover. When such media is positioned on the glass, an attraction occurs between the glass and the media, tending to hold the media in a preselected position on the glass. This will cause an attraction to the platen rather than the platen cover.

In an alternate embodiment of the invention, the electrostatic charge is imparted to the platen actively by the movement of a charged corona wire relative to and in the proximity of the platen formed of a first insulator material.

A method for retaining media in a predetermined position for imaging on a flatbed imaging device may include the steps of imparting an electrostatic charge to a platen and electrostatically retaining the media in the pre-selected position on the platen for the imaging process. The electrostatic charge may be imparted passively or actively to the platen. The method is non-intrusive in that no marks or sticky residue from adhesive or cohesive fasteners are left on the platen. In one preferred embodiment of the invention, the glass platen may be coated or laminated with a clear plastic or polymeric film for increasing the static charge on the surface of the platen.

DETAILED DESCRIPTION

Figure 4:
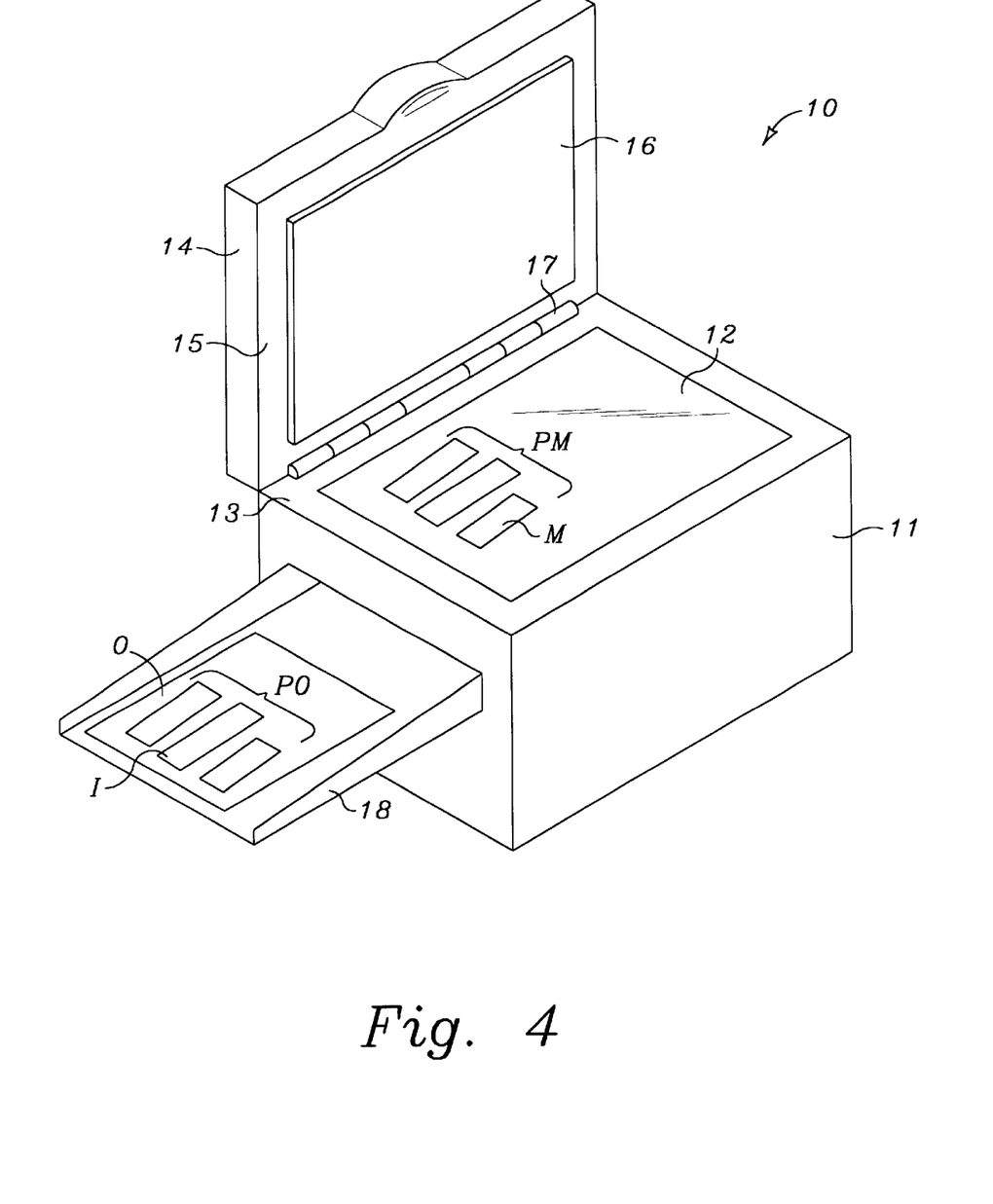
FIG. 4 is a representative perspective view of a flatbed imaging device according to the present invention.
Figure 5:
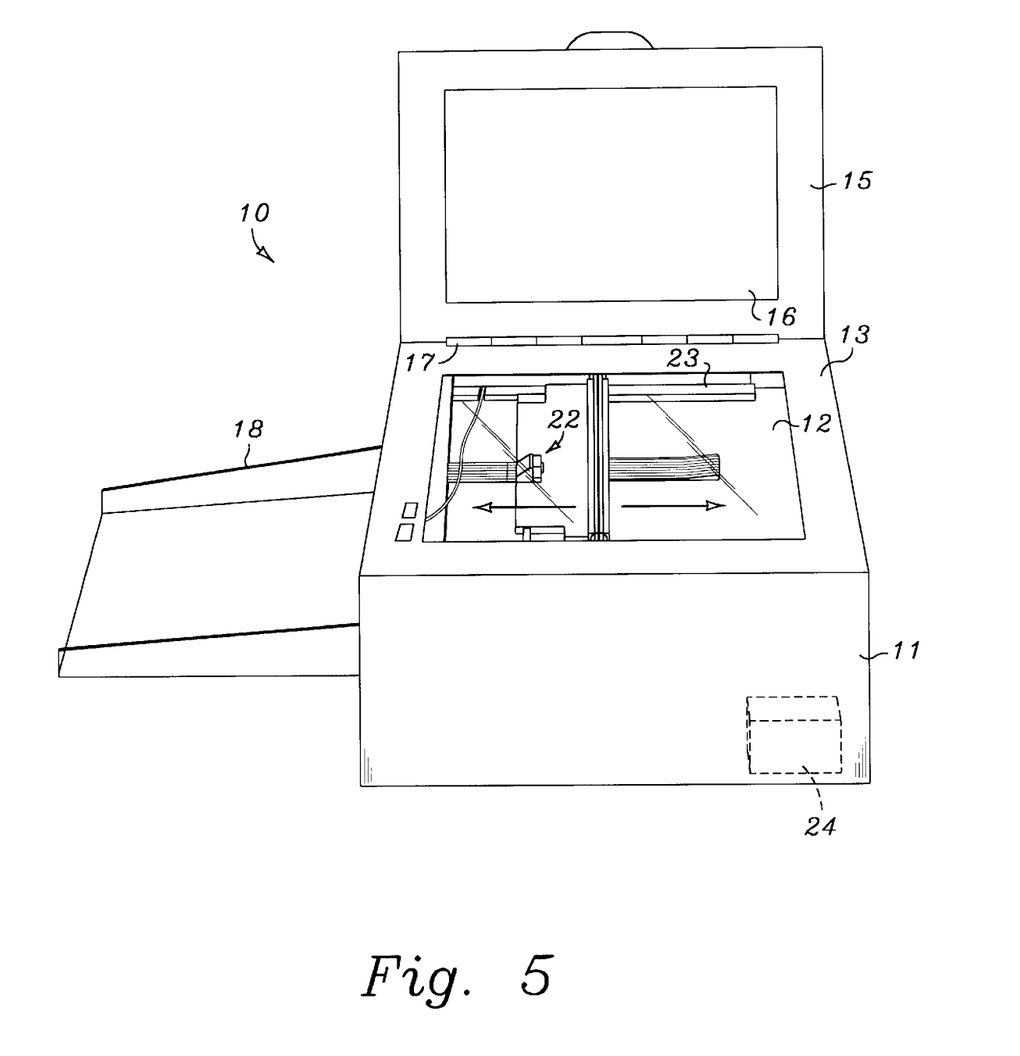
FIG. 5 is a representative perspective view of a flatbed imaging device according to the present invention.

FIGS. 4 and 5 illustrate flatbed imaging device 10. Flatbed imaging device 10 includes housing 11. Platen 12 forms a portion of upper surface 13 of housing 11. In the embodiment of the invention shown at FIG. 4, platen 12 is formed of a glass panel which serves as a first insulator material. Cover 14 includes lower surface 15 to which opposing insulator material 16 is affixed. Flatbed imaging device 10 is shown including media output tray 18. As seen in FIG. 4, cover 14 is movable with respect to platen 12 at hinge 17. Media M is positioned on platen 12 in a pre-selected media position PM. Output O includes image I that represents in part an output position PO of media M.

As shown in FIG. 5, positioned within housing 11 are imaging assembly 22, transport assembly 23 and controller 24 all operable as disclosed and well known in the prior art.

FIGS. 6, 7, 8 and 9 are representative side views of flatbed imaging device 10 including housing 11. Platen 12 forms a portion of upper surface 13 of housing 11. Platen cover 14 connects to body 11 at hinge 17. Opposing insulator material 16 is affixed to platen cover 14. Platen cover 14 is movable with respect to platen 12 at hinge 17. Static charge 25 is shown resident in platen 12. Opposing charge 26 is shown present in media M.

Figure 6:
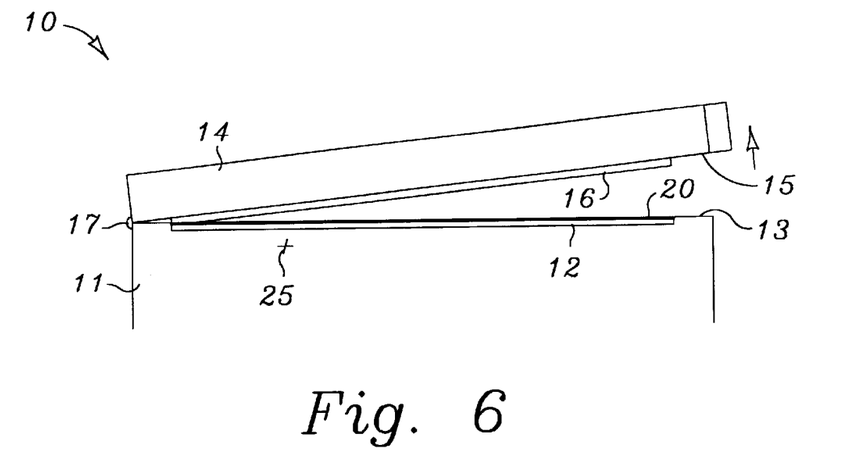
FIG. 6 is a representative side view of a flatbed imaging device according to the present invention.

In the embodiment of the invention shown at FIG. 6, platen 12 is formed of a glass panel having insulator film 20 applied to an upper surface of platen 12 which serves as a first insulator material. Alternately, platen 12 may be formed of a laminated or composite of a plastic or other polymer and glass. Platen cover 14 includes lower surface 15 to which opposing insulator material 16 is affixed.

Figure 7:
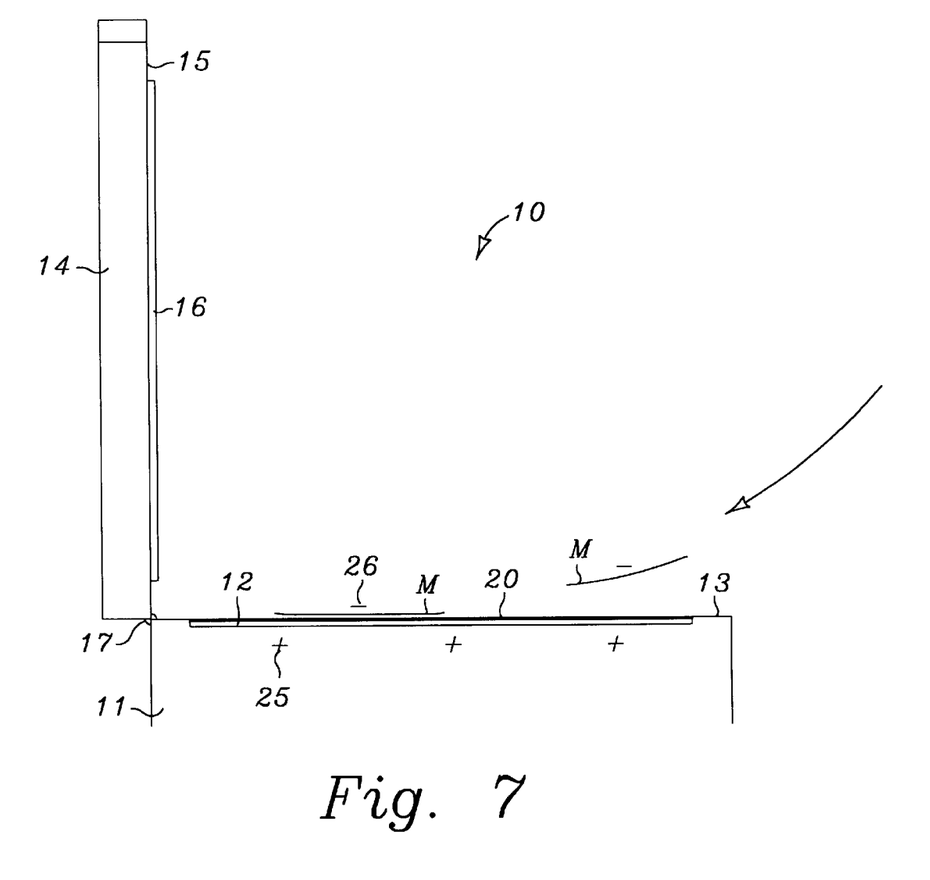
FIG. 7 is a representative side view of a flatbed imaging device according to the present invention.
Figure 8:
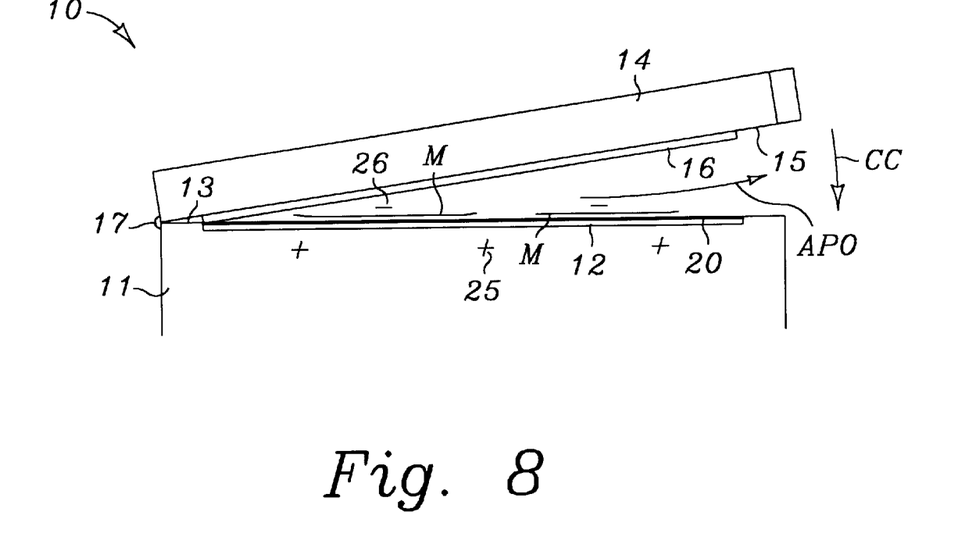
FIG. 8 is a representative side view of a flatbed imaging device according to the present invention.
Figure 9:
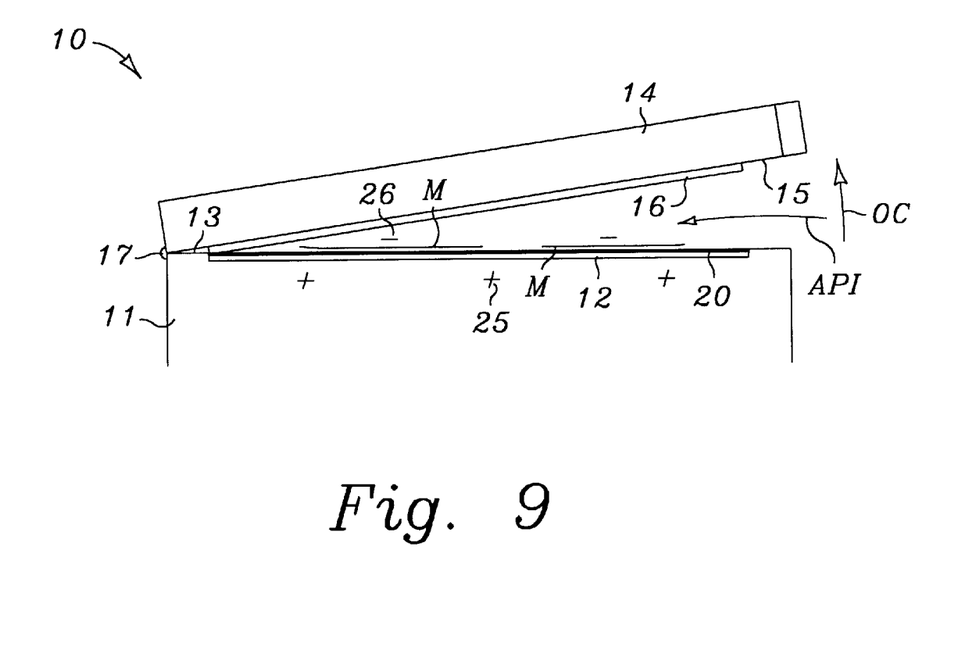
FIG. 9 is a representative side view of a flatbed imaging device according to the present invention.

As seen in FIG. 7 media M is being positioned on platen 12. Static charge 25 holds media in position. As seen in FIG. 8, static charge 25 holds media M in position on platen 12 as platen cover 14 is moved to closed position CC relative to platen 12 creating air pressure flow out APO from between platen cover 14 and platen 12. Similarly, and as shown FIG. 9, static charge 25 holds media M in position on platen 12 as platen cover 14 is moved to an open position OC relative to platen 12 creating air pressure flow in API between platen cover 14 and platen 12.

Figure 10:
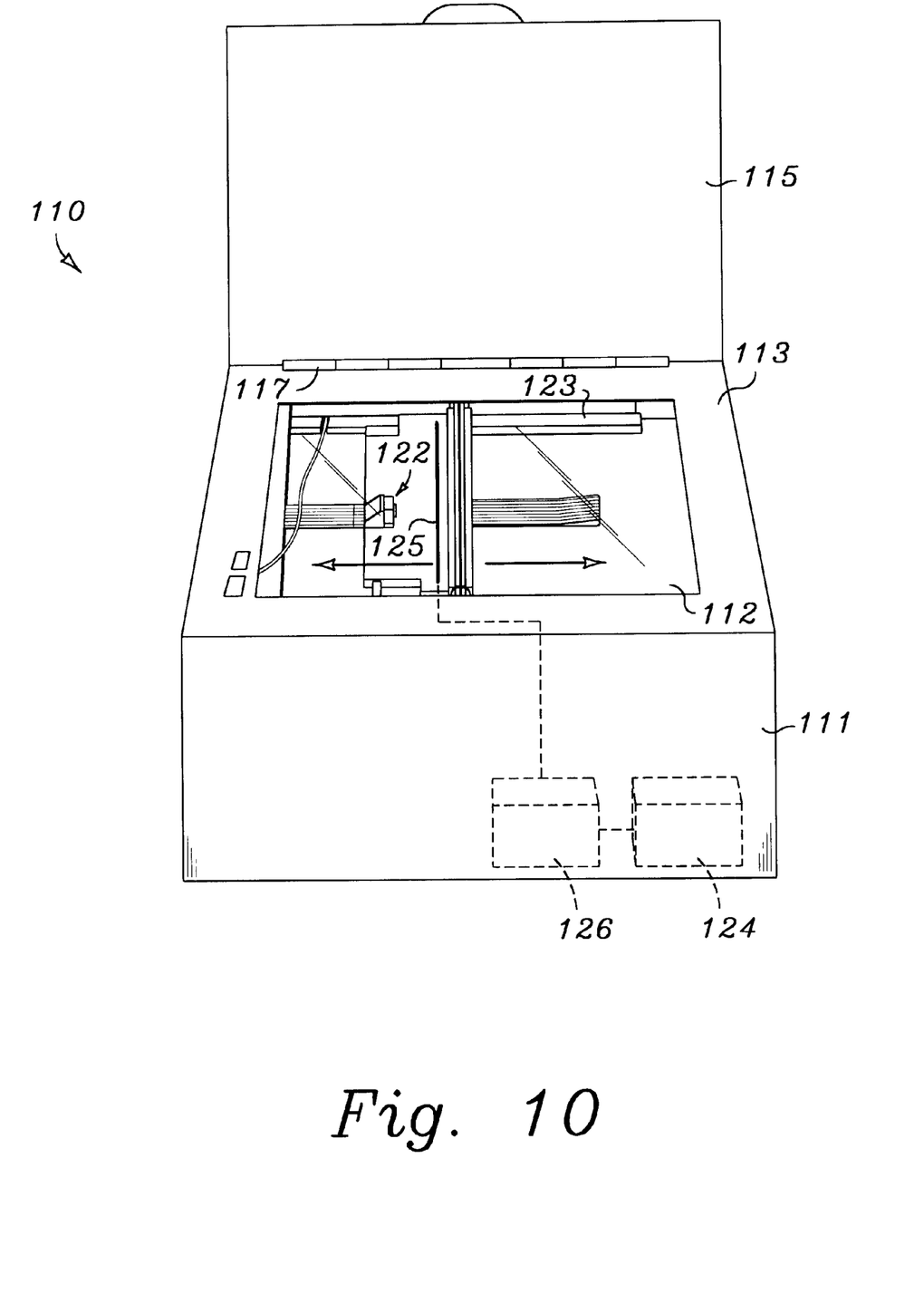
FIG. 10 is a representative perspective view of a flatbed imaging device according to the present invention.

FIG. 10 illustrates flatbed imaging device 110. Flatbed imaging device 110 includes housing 111. Platen 112 forms a portion of upper surface 113 of housing 111. Cover 115 is pivotably connected to housing 111. In the embodiment of the invention shown at FIG. 10, platen 112 is formed of a polymeric panel. Cover 115 is movable with respect to platen 112 at hinge 117. As shown in FIG. 10, positioned within housing 111 are imaging assembly 122, transport assembly 123 and controller 124 all operable as disclosed and well known in the prior art. Corona wire 125 is attached to transport assembly 123 and extends substantially the full width of platen 112. Corona wire 125 is transported with imaging assembly 122 by transport assembly 123. Power supply 126 is connected and responds to controller 124. When signaled by controller 124, power supply 126 provides a charge to corona wire 125 which in turn emits charged particles along the underside of platen 112. As a result, an electrostatic charge is imparted to platen 112.

Figure 11:
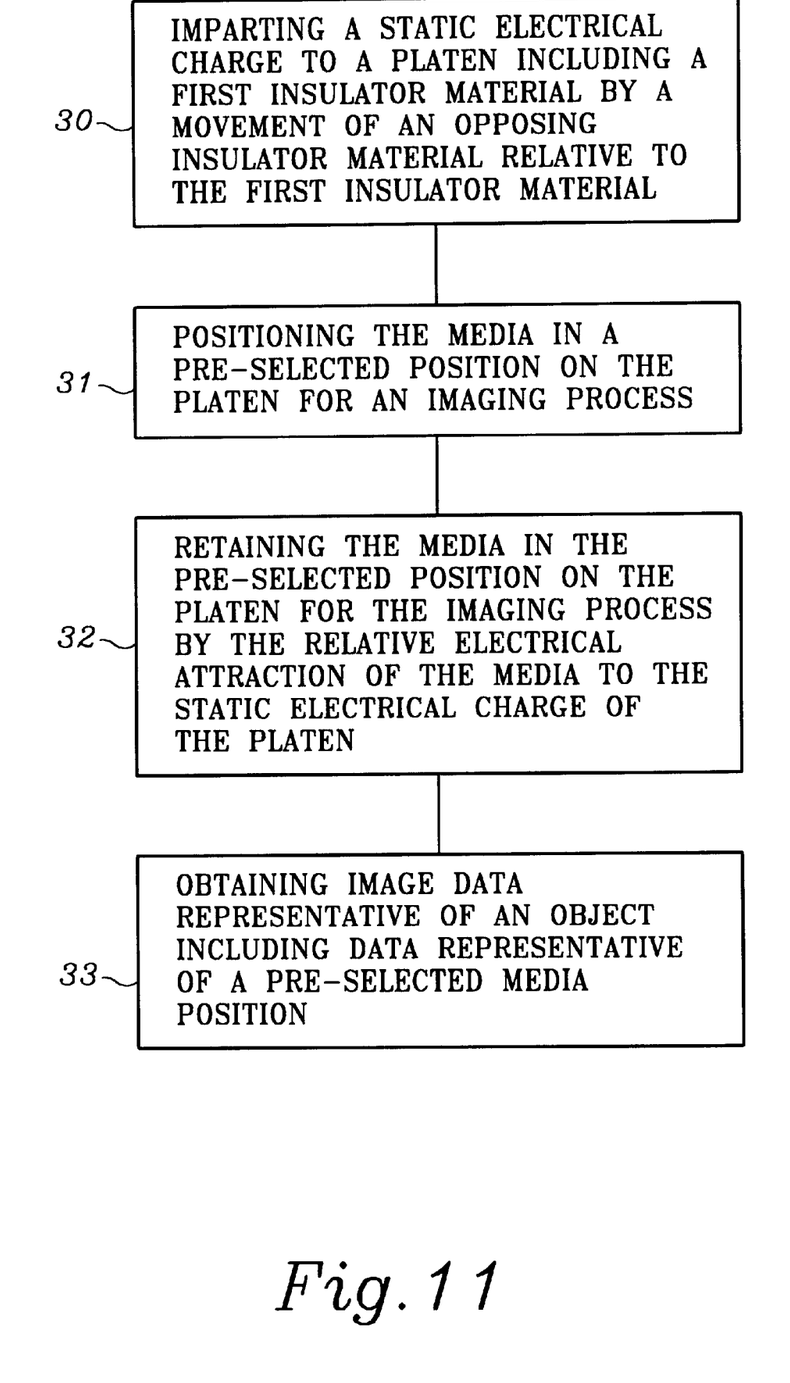
FIG. 11 is a schematic flow chart depicting a method of retaining media in a predetermined position for an imaging process according to the present invention.

FIG. 11 is schematic flow chart depicting a method of retaining media in a predetermined position for an imaging process according to the present invention including the steps of imparting a static electrical charge to a platen including a first insulator material by a movement of an opposing insulator material relative to the first insulator material 30, positioning the media in a pre-selected position on the platen for an imaging process 31, retaining the media in the pre-selected position on the platen for the imaging process by the relative electrical attraction of the media to the static electrical charge of the platen 32 and obtaining image data representative of an object including data representative of a pre-selected media position 33.

While this invention has been described with reference to the detailed embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A media retaining device for a flatbed imaging device comprising:
    a platen forming a surface of the flatbed imaging device; and
    an electrostatic charge imparted to the platen for retaining a media on the flatbed imaging device.

2. The media retaining device of claim 1 wherein the electrostatic charge further comprises an electrostatic charge passively imparted to the platen.

3. The media retaining device of claim 1 wherein the electrostatic charge further comprises an electrostatic charge actively imparted to the platen.

4. A media retaining device for a flatbed imaging device comprising:
    a platen forming a surface of the flatbed imaging device, the platen including a first insulator material having a first triboelectric effect value;
    a cover attached to the flatbed imaging device, the cover including an opposing insulator material having a second triboelectric effect value, the cover movable relative to the platen; and
    an electrostatic charge imparted to the platen by a movement of the opposing insulator material relative to the platen.

5. The media retaining device of claim 4 further comprising:
    the platen including the first insulator material including a first positive triboelectric effect value; and
    the cover including the opposing insulator material including a second negative triboelectric effect value.

6. The media retaining device of claim 4 further comprising:
    the platen including the first insulator material including a first negative triboelectric effect value; and
    the cover including the opposing insulator material including a second positive triboelectric effect value.

7. The media retaining device of claim 4 further comprising:
    the platen including the first insulator material including a first relatively greater triboelectric effect value; and
    the cover including the opposing insulator material including a second relatively lesser triboelectric effect value.

8. The media retaining device of claim 4 further comprising:
    the platen including the first insulator material including a first relatively lesser triboelectric effect value; and
    the cover including the opposing insulator material including a second relatively greater triboelectric effect value.

9. The media retaining device of claim 4 wherein the platen including the first insulator material further comprises glass.

10. The media retaining device of claim 4 wherein the platen including the first insulator material further comprises a plastic.

11. The media retaining device of claim 4 wherein the platen including the first insulator material further comprises a coated glass.

12. A flatbed imaging device comprising:
    a housing;
    a platen forming the surface of the housing;
    an electrostatic charge imparted to the platen by the movement of a corona wire relative to the platen;
    a scanner controller positioned within the housing;
    an imaging assembly connected to the scanner controller for generating data representative of an image; and
    a transport assembly connected to the scanner controller for moving the imaging assembly relative to the media positioned on the platen.

13. The flatbed imaging device of claim 12 further comprising:
    the platen including the first insulator material having a first triboelectric effect value;
    the cover including an opposing insulator material having a second triboelectric effect value, the cover movable relative to the platen; and
    the electrostatic charge imparted to the platen by movement of the cover including the opposing insulator material relative to the platen including the first insulator material.

14. The flatbed imaging device of claim 13 further comprising:
    the platen including the first insulator material including a first positive triboelectric effect value; and
    the cover including the opposing insulator material including a second negative triboelectric effect value.

15. The flatbed imaging device of claim 13 further comprising:
    the platen including the first insulator material including a first negative triboelectric effect value; and
    the cover including the opposing insulator material including a second positive triboelectric effect value.

16. The flatbed imaging device of claim 13 wherein the platen including the first insulator material further comprises glass.

17. The flatbed imaging device of claim 13 wherein the platen including the first insulator material further comprises a plastic.

18. The flatbed imaging device of claim 13 wherein the platen including the first insulator material further comprises a coated glass.

19. The flatbed imaging device of claim 12 further comprising:
    a charge emitting device attached to the transport assembly for movement relative to the platen; and
    a power supply connected to the scanner controller and the charge emitting device for imparting the electrostatic charge to the platen.

20. A method for retaining media in a preselected media position on a platen of a flatbed imaging device for an imaging process, the method including the steps of:
    imparting an electrostatic charge to the platen of the flatbed imaging device; and
    positioning the media in a preselected media position on the platen for the imaging process, the electrostatic charge retaining the media in the preselected media position on the platen.

* * * * *